United States Patent [19]

Sakai et al.

[11] Patent Number: 5,458,542
[45] Date of Patent: Oct. 17, 1995

[54] AUTO TENSIONER

[75] Inventors: Kouichi Sakai, Zama; Hayato Oumi, Chigasaki; Hiroshi Suzuki, Yokohama, all of Japan

[73] Assignee: NSK Ltd., Tokyo, Japan

[21] Appl. No.: 278,907

[22] Filed: Jul. 22, 1994

Related U.S. Application Data

[63] Continuation of Ser. No. 115,681, Sep. 3, 1993, Pat. No. 5,352,160.

[30] Foreign Application Priority Data

Sep. 3, 1992 [JP] Japan ................................. 4-67543
May 12, 1993 [JP] Japan ................................. 5-29569

[51] Int. Cl.⁶ ........................................ F16H 7/08
[52] U.S. Cl. ........................................ 474/135
[58] Field of Search .................... 474/101, 109–111, 474/113–117, 133–138

[56] References Cited

U.S. PATENT DOCUMENTS

| | | |
|---|---|---|
| 4,657,524 | 4/1987 | Okabe . |
| 4,798,563 | 1/1989 | Okabe et al. . |
| 4,904,230 | 2/1990 | Kawashima et al. . |
| 5,098,347 | 3/1992 | Sajczvk et al. ........................ 474/135 |
| 5,254,048 | 10/1993 | Gardner et al. ........................ 474/135 |
| 5,277,667 | 1/1994 | Gardner et al. ........................ 474/135 |

FOREIGN PATENT DOCUMENTS

| | | |
|---|---|---|
| 300858 | 1/1989 | European Pat. Off. . |
| 478267 | 4/1992 | European Pat. Off. . |
| 279415 | 3/1952 | Switzerland . |
| 2189570 | 10/1987 | United Kingdom . |

*Primary Examiner*—Michael Powell Buiz
*Attorney, Agent, or Firm*—Evenson, McKeown, Edwards & Lenahan

[57] ABSTRACT

An auto tensioner comprises a rocking member the base end portion of which is supported by a fixed shaft so that it can rock freely, and on the tip end portion of which there is a pulley that is freely rotatably supported, a torsional coil spring for applying a resilient force in the rotational direction to the rocking member so that it pushes the pulley onto the belt, a damper device located between the rocking member and a fixed projection located in a base member wherein when the rocking member is turned by the resilient force of the torsion coil spring, the bottom of the damper device and the projection supported by the base member are separated so as to move the pulley quickly, and when the rocking member is turned in the opposite direction, the rocking arm pushes the top end of the damper device, so that the pulley is displaced slowly by the movement of the damper device whereby it does not require much space, and so that it can effectively do away with slack in the belt.

7 Claims, 13 Drawing Sheets

AUTO TENSIONER

This application is a continuation of my application Ser. No. 07/115,681, filed Sep. 3, 1993 now U.S. Pat. No. 5,352,160.

FIELD OF THE INVENTION

This invention relates to an auto tensioner used for applying the proper tension to the timing belt of an automobile engine, or to the belts which drive auxiliary equipment such as the alternator or compressor (all of these belts will simply be referred to as belts below).

DESCRIPTION OF THE PRIOR ART

In order to turn the cam shaft of an OHC-type or DOHC-type engine synchronizing with the crank shaft, a drive mechanism with a belt 1 like that shown in FIG. 1, has been widely used. In FIG. 1, a drive pulley 2 is driven and turned by the crank shaft of the engine. A follower pulley 3 is attached to the end of the cam shaft. Guide pulleys or follower pulleys 4 are used for guiding the belt 1, or for driving auxiliary equipment such as the water pump. And a pulley 5 is provided for applying the proper tension to the belt 1.

This pulley 5 rotates around and is supported by an rocking member 7 which rocks around an axle 6. A spring 8 is located on the end of the bracket 15 which is fastened to the rocking member 7, and the belt 1 is constantly placed under a substantially fixed tension, by elastically pushing the pulley 5 toward the belt 1, regardless of dimensional changes of the belt 1 due to changes in temperature, or vibrations due to operation of the engine.

Besides the function of applying tension to the belt 1, it is desired that the auto tensioner also function to hold or retain the belt 1. In other words, in the drive device of the cam shaft shown in FIG. 1, when the drive pulley 2 turns, there is an inclination for the portion of the belt 1 which is located between the pulley 2 and the pulley 5 to vibrate in a direction perpendicular to the direction that the belt is moving. If this vibration is allowed as is, the amplitude of the vibration will become larger (the vibration will grow) and abnormal vibrations will occur in the section driven by to the belt 1, or in the case of a toothed belt, problems such as so called tooth jumping may occur.

Therefore recently, as disclosed in Japanese Patent First Publications KOKAI Nos. S58-65357 and S63-180759, a damper device is installed in the auto tensioner, and this damper device is used for holding or retaining the belt 1. An example of such damper devices is shown in FIG. 2.

A rocking member 10 is rockingly supported by a sliding bearing 11 around the fixed or stationary shaft 9 which is fixed to the front face etc. of the cylinder block of an engine. The front half section 12 of the rocking member 10 is eccentric to the fixed shaft 9. The pulley 5 is supported by the rolling bearing 13 rotatably around the front half section 12 of the rocking member 10. A bracket 15 is fitted into the base half section 14 of the rocking member 10, and has an end section formed with a fastener 16.

A tension spring (not shown) is engaged at its end portion with the fastener 16, so that a resilient force is applied to the rocking member 10 in a rotating direction around the fixed shaft 9. Accordingly, the outer peripheral or circumferential surface of the pulley 5 is elastically pressed against the belt 1 (FIG. 1) due to the resilient force.

Defined between the outer peripheral surface or circumferential of the fixed shaft 9 and the inner peripheral surface or circumferential of the rocking member 10 is a space 17 in which a plurality of stationary flat plates 18 and moving flat plates 19 alternatively arranged. The plurality of flat plates 18 are supported at the inner periphery so as not to rotate with reference to the fixed shaft 9, while the plurality of moving flat plates 19 are supported so as not to rotate with reference to the rocking member 10. The space 17 is filled with a viscous fluid such as oil through the oil feed aperture 20, which is closed by a steel ball 21 after the viscous fluid is filled in.

A retaining plate 32 is fitted onto the fixed shaft 9 so as to prevent the stationary flat plates 18 and moving flat plates 19 from separating from each other.

The side faces of the stationary flat plates 18 are opposed to those of the moving flat plates 19 with a very thin clearance between them. Since the clearance are filled with the viscous fluid, the rapid relative displacement between the flat plates 18 and 19 is prevented by the shearing force added to the viscous fluid in the clearance. Consequently, the pulley 5 is prevented from retracting instantly even when the tension of the belt 1 is rapidly increased at any part of the belt 1.

Also, in order to more reliably prevent the belt 1 from becoming loose, an auto tensioner is tailored such that if the belt 1 becomes loose, the pulley 5 is made to quickly follow it, and if the belt 1 becomes tight, the pulley 5 is not substantially retracted so that the belt 1 is retained or held. This kind of auto tensioner has been disclosed e.g. in Japanese Patent First Publications KOKAI Nos. S63-167163, H2-72252, H2-80839 and H3-24346, Utility Model KOKAI Nos. H2-16846, H2-98243 and H4-39349.

The auto tensioners described in these public disclosures are equipped with e.g. a single-direction clutch located between a viscous damper and a rocking member (Patent KOKAI No. S63-167163), a latchet mechanism (Patent KOKAI No. H2-80839, Utility Model KOKAI No. H2-16846), a damper device installed with a check valve to function in only one direction (Patent KOKAI Nos. H2-72252, H3-24346, Utility Model KOKAI No. H2-98243), or a damper device with an inclined surface making it easy for a viscous fluid to flow in only one direction (Utility Model KOKAI No. H4-39349).

Also described in Japanese Patent First Publications KOKAI No. S62-274143 and Utility Model KOKAI No. S60-52458 is the construction of an auto tensioner where the rocking member and damper device are formed separately, and each is installed separately on the front surface of the cylinder block of the engine. FIG. 3 shows an example of this kind of auto tensioner.

The rocking member 10 which supports the pulley 5 is pivotably supported by an axle 22 located e.g. on the front face of the cylinder block. The cylinder 24 which makes up the damper device 23 is fastened e.g. to the front face of the cylinder block separately from the rocking member 10, and a hollow piston 25 is free to move in the viscous fluid which is enclosed in the cylinder 24. A compression spring 26 is located between one end of this piston 25 and the far end of the cylinder 24, and the other end of the piston is connected to the base end portion of a push rod 27. The tip end portion of the push rod 27 is abutted to part of the rocking member 10, so that the resilient force of a compression spring 26 is transmitted to the rocking member 10. Also, the pulley 5 is pushed onto the belt 1 by the resilient force of the compression spring 26. As disclosed in Utility Model KOKAI No.

S60-52458, there may also be a spring located on the rocking member 10 in addition to the compression spring 26 inside the damper device 23.

In addition, a pair of spaces 28 and 29 are located on opposite sides of the piston 25 and communicated with each other by an oil path 30 located in the piston 25 and the push rod 27 through the center of them. The opening end of the oil path 30 is faced to the space 28 that has a compression spring 26, and provided with a check valve 31 that opens only when the viscous fluid flows.

In the auto tensioner shown in FIG. 3 having this kind of construction, the push rod 27 moves very quickly in the protruding direction (upward direction in FIG. 3), however movement in the retracting direction (downward direction in FIG. 3) is only slow. Therefore, the pulley 5 quickly follows the belt 1 when it becomes loose, and when the belt 1 becomes tight, it does not substantially retract so that the belt 1 is held or retained.

However, the auto tensioners described in the above patent disclosures each have the problems mentioned below.

In the case of the prior art mechanism disclosed in Patent First Publications KOKAI Nos. S58-65357 and S63-180759 as shown in FIG. 2, the pulley 5 moves only very slowly in any direction, so that when the belt becomes loose, the pulley 5 does not follow it, and the belt tension drops temporarily.

Also for the auto tensioners disclosed in the Publications as mentioned above (KOKAI Nos. S63-167163, H2-72252, H2-80839, H3-24346, H2-16846, H2-98243, and H4-39349), the single-direction clutch is not durable enough due to the fletching friction (KOKAI No. S63-167163), the internal construction is so complicated to make the production difficult and increase the production cost (KOKAI Nos. H2-72252, H2-80839, H3-24346, H2-16846, and H2-98243), and it is easy for the characteristics to change over time due to wear of the parts, and even when the belt is loose, there is a little resistance due to the viscous fluid, so that the ability of the pulley to follow is not sufficient (KOKAI Nos. H2-72252, H3-24346, H2-98243, and H4-39349).

Also for the auto tensioner shown in FIG. 3, it is necessary that the rocking member 10 and the damper device 23 be installed separately e.g. on the front face of the cylinder block, and therefore not only is the set-up very troublesome, but it requires much space, and so the engine in which this auto tensioner will be installed must be large, and the weight is increased.

For the auto tensioner as shown in FIG. 3, it is proposed in Utility Model First Publication KOKAI No. H2-56950 that it can be made more compact and easier to install if the member which is provided with the shaft 22 is combined with the cylinder 24 which makes up the damper device 23, and if the resilient force of a torsion coil spring is used to push the pulley in the direction of the belt. However, in the mechanism described in this disclosure, there is a short distance between the shaft 22 and the axle which supports the pulley, so that it is not possible for the pulley to be displaced much in order to apply pressure to the belt.

An auto tensioner can be made such as is disclosed in Utility Model KOKAI No. H2-54946 where the displacement of the pulley can be increased in amount by increasing the distance between the shaft 22 and axle, and the pulley is pushed in the direction of the belt by the resilient force of a torsion coil spring. However, in the case of this prior art construction, vibration of the belt is not effectively damped or stopped because the vibration of the pulley is damped or stopped simply using friction resistance and internal losses of the rubber.

SUMMARY OF THE INVENTION

An objective of the present invention is to provide an auto tensioner which solves all of the problems of the auto tensioner devices described in the disclosures mentioned above, and improves the durability and the reliability of the auto tensioner.

Another objective of the present invention is to improve the ability of the auto tensioner to follow the movement of the belt, making it possible to maintain constantly a proper tension in the belt.

Another objective of the present invention is to provide an auto tensioner with an inexpensive cost which can be installed in a narrow or very small space while it can sufficiently follow the belt even loosened whereby it is possible to make it as compact and light weight as possible.

An auto tensioner for use in applying a tension to a running belt according to the present invention comprises a base member having a projection, a fixed shaft securely mounted to the base member, a rocking member rockingly mounted to the fixed shaft and having a rocking arm, an axle secured to the rocking member, a pulley rotatably mounted to the axis for applying the tension to the running belt, the fixed shaft being located outside the outer peripheral surface of the pulley so as to provide the pulley with a larger rocking range with reference to the fixed shaft, a torsion coil spring provided around the fixed shaft and having opposite ends respectively engaged with the base member and the rocking member, and a damper device provided between the projection on the base member and the rocking member.

DESCRIPTION OF THE PREFERRED EMBODIMENTS

Figure 1:
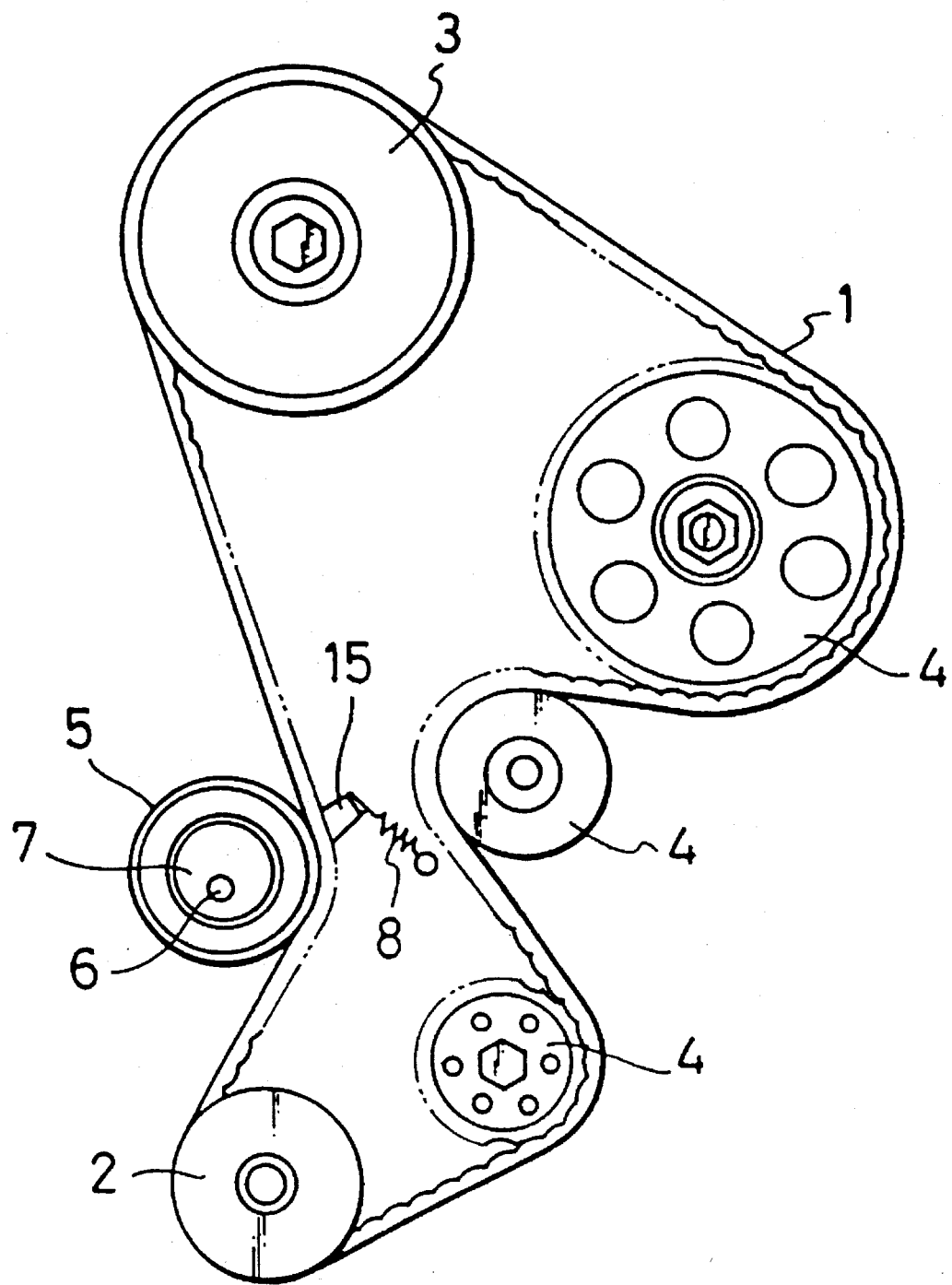
FIG. 1 is a front elevational view of a belt drive apparatus for an engine to which an auto tensioner is applied.
Figure 2:
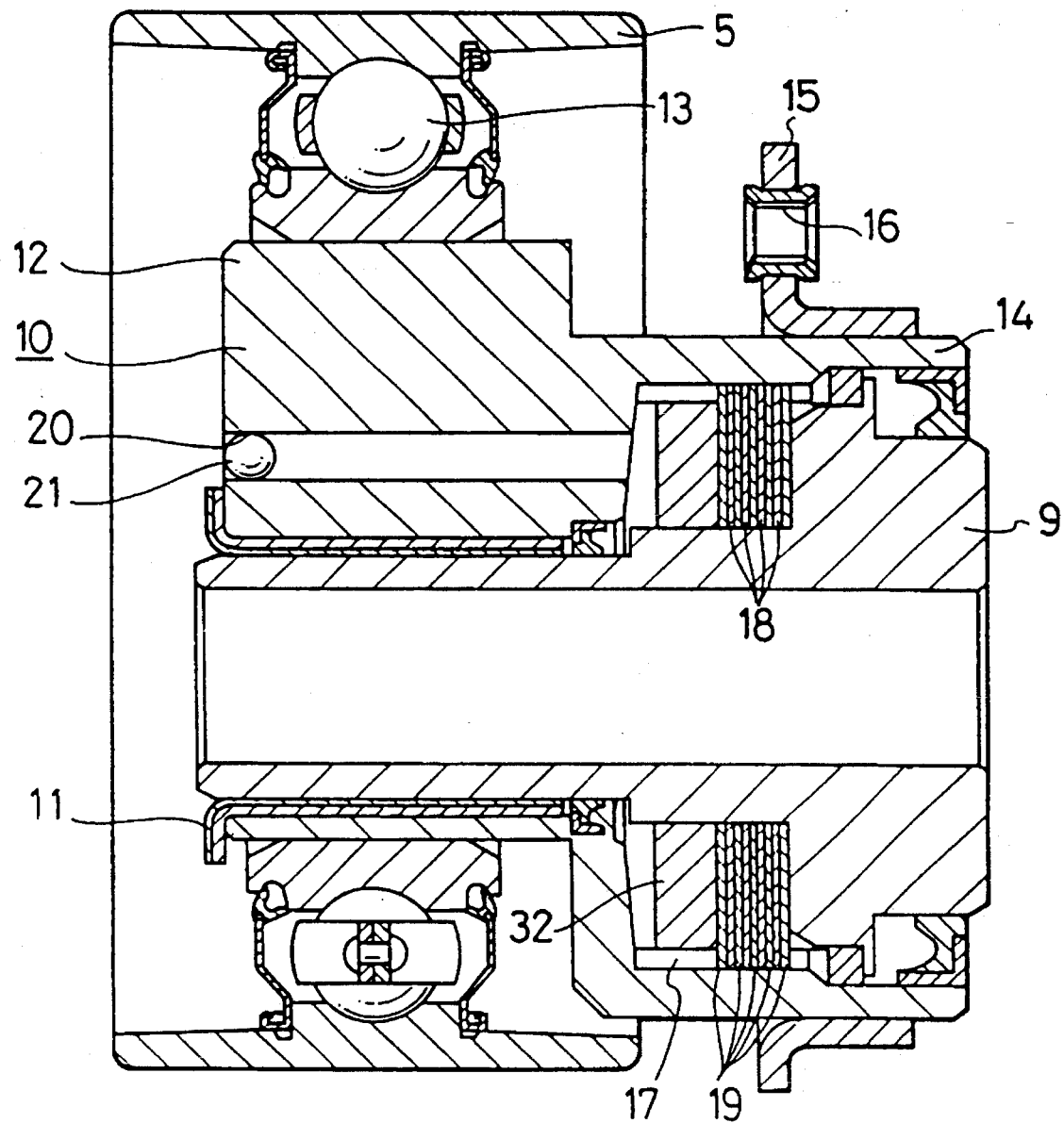
FIG. 2 is a cross sectional view of an example of the prior art auto tensioners.
Figure 3:
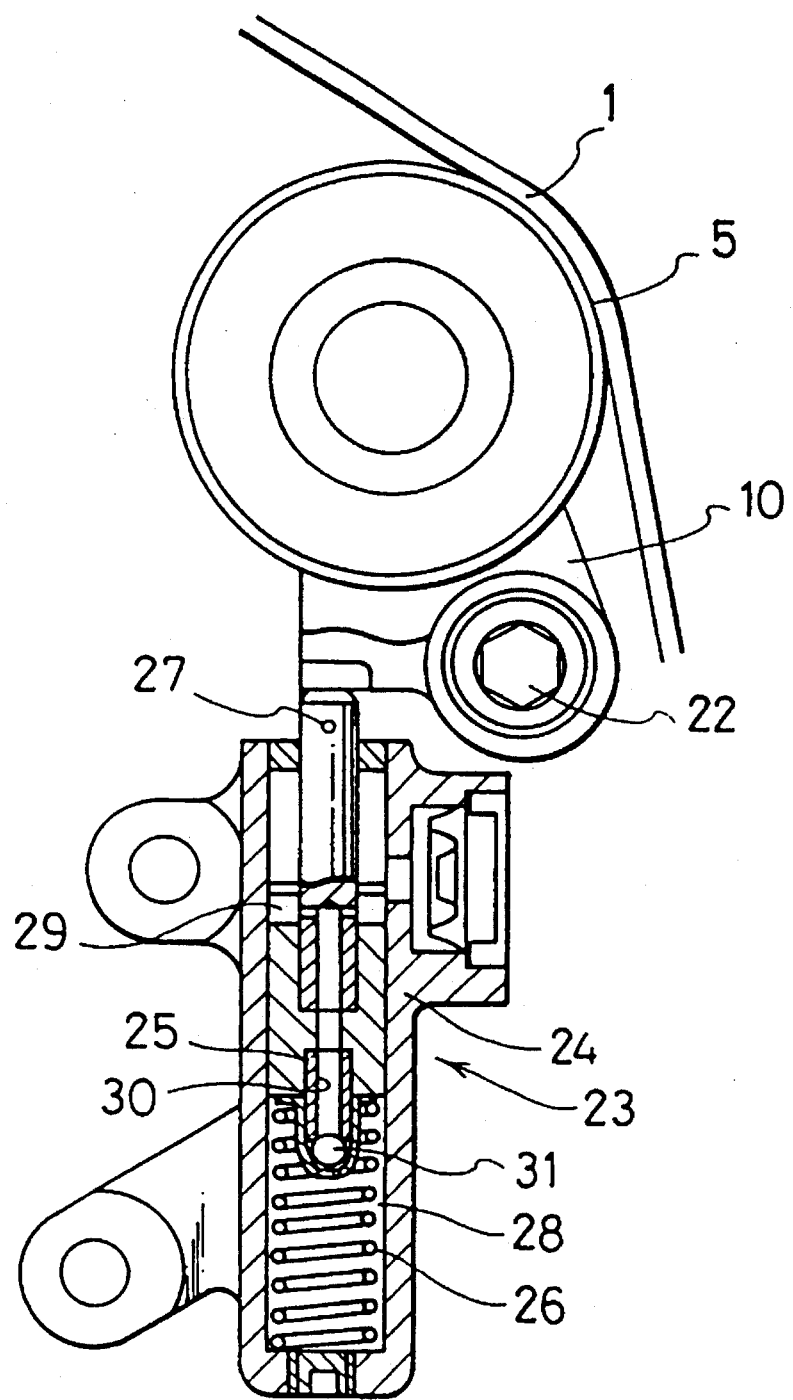
FIG. 3 is a cross sectional view of another example of the prior art auto tensioners.

The auto tensioner according to a first embodiment of this invention as shown in FIG. 4 to FIG. 7, comprises a fixed member 33, a fixed shaft 37 which is located on the fixed member 33, a rocking member 38 having a tip portion and a base portion which is supported freely rotatably around the fixed shaft 37, an axle 45 which is located on the tip portion of the rocking member 38 in parallel to the fixed shaft 37, a pulley 44 which is supported freely rotatably around this axle 45, a coil section 50 provided around the fixed shaft 37 and having a torsion coil spring 49 having a pair of fasteners 51a and 51b located on its both ends so that by having the fastener 51b held in place by the hole 52b in the rocking member 38, and the fastener 51a by the hole 52a in the fixed member 33, it applies a force that pushes the pulley 44 of the rocking member 38 in the direction of the belt 69, and a damper device 55 having a base portion which is supported by a fixed arm 54 formed in the fixed member 33, and a tip end portion which is opposed to a receiving block 58 that is fitted into an rocking arm 56 formed in the rocking member 38. The tip end portion of the damper device 55 may be opposed to the receiving block 58 provided in the fixed arm 54 with the base portion supported by the rocking arm 56 as described later.

The fixed member 33 has a mount hole 34 in its mid section, through which a bolt (not shown) extends so that the fixed member 33 is secured e.g. to the front face of the cylinder block.

Formed on one end of the fixed member 33 (upper side of FIGS. 4 and 5) is a circular hole 36 into which the base portion of the annular fixed shaft 37 is fitted.

The rocking member 38 has a base portion (lower side in FIGS. 4 and 5) which is rotatably supported around the fixed shaft 37. Specifically, the cylindrical portion 39 formed in the base portion of the rocking member 38 is fitted onto the fixed shaft 37 through the sliding bearings 40 and 41. The bolt 35 (see FIG. 6) inserted into the fixed shaft 37 is threaded into the screw hole formed in the front face of the cylinder block and cooperates with the bolt inserted into the mount hole 34 so as to prevent the fixed member from rotating.

Moreover, this damper device 55 comprises a cylinder 60 that contains a viscous fluid inside it, a piston 61 that fits inside this cylinder 60 so that it can freely move in the axial direction, a spring 62 that is located between the piston 61 and the cylinder 60 to bias the piston 61 in only one direction, a plunger 59 which increases the amount of protrusion from the cylinder 60 corresponding to the displacement of the piston 61 caused by the resilient force of this spring 62, a path 63 through which both ends of the piston 61 in the axial direction are communicated with each other, and a check valve 67 which opens and closes this path 63. This check valve 67 closes only when the piston 61 is displaced against the resilient force of the spring 62.

It will be noted that the fixed shaft 37 is located further out in the radial direction than the outer peripheral or circumferential surface of the pulley 44.

In the operating conditions of the auto tensioner of the first feature of this invention as described above, the rocking member 38 rocks due to the resilient force of the torsion coil spring 49, so that the pulley 44, which is freely rotatably supported around axle 45 on the tip end portion of the rocking member 38, is elastically pushed in the direction of the belt 69. Since the pulley 44 is pushed onto the belt 69, rocking of the rocking member 38 is restricted. Therefore, the plunger 59, which follows the displacement of the piston 61 in the damper device 55 supported by the fixed arm 54, comes in contact or abutment with the receiving block 58, and the tip end portion of the plunger 59 is pushed against the receiving block 58 due to the resilient force of the spring 62 in the damper device 55.

If the belt 69 then becomes loose, the rocking member 38 rocks due to the resilient force of the torsion coil spring 49, and the pulley 44 follows the movement of the belt 69. When this happens, displacement of the plunger 59 is a little delayed, so that the end of the plunger 59 and the receiving block 58 are separated. Accordingly, when the belt 69 becomes loose, there is absolutely no resistance by the damper device 55 against the rocking member 38 which turns so that the pulley 44 follows the movement of the belt 69. Accordingly, the pulley 44 quickly follows the movement of the belt 69, and prevents tension in the belt 69 from dropping. The plunger 59 protrudes out from the cylinder 60 a little later than the movement of the rocking member 38 due to the resilient force of the spring 62 until the tip end portion of the plunger 59 comes in abutment with the receiving block 58. In this way, when the plunger 59 is pushed out from the cylinder 60 by the resilient force of the spring 62, the check valve 67 located inside the damper device 55 is opened, and therefore displacement of the piston 61 and plunger 59 are relatively fast and the tip end portion of the plunger 59 comes in abutment with the receiving block 58 after only an very short time.

On the other hand, when the tension in the belt 69 increases, the rocking member 38 turns so as to press against the resilient force of the torsion coil spring 49. In this condition, the receiving block 58 is pressed against the tip end portion of the plunger 59, and so the plunger 59 must be pressed against the resilient force of the spring 62 and be pushed inside the cylinder 60 in order to turn the rocking member 38. When this happens, the check valve 67 of the damper device 55 is closed and displacement of the piston 61 and plunger 59 can only be performed slowly. As a result, the pulley 44 supported by the rocking member 38 is also displaced slowly due to the operation of the damper device 55, and the belt 69 is held or retained by the pulley 44, so that vibrations in the belt 69 do not grow.

Also, on the tip end portion of the rocking member 38, there is a circular protruding section 42 which forms an axle that runs parallel to the fixed shaft 37, and the inner ring 47 of a rolling bearing 44 is installed on this protruding section 42. The rolling bearing 44 freely rotatably supports the pulley 43. In other words, the region around the center hole of the inner ring 47 is secured by putting a bolt 45 through the hole in the center of the inner ring 47 and through a flat washer 48 and fastening it with a nut 46, so that the inner ring 47 is prevented from falling from the protruding section 42, and the pulley 43 is thus freely rotatably supported on the tip end portion of the rocking member 38. In this condition, the fixed shaft 37 is located further out in the radial direction than the outer peripheral surface of the pulley 43.

The coil section 50 of the torsion coil spring 49 is located around the circular section 39. This torsion coil spring 49 has a pair of fasteners 51a and 51b located on both ends of the coil section 50, and is held in place by inserting fastener 51a into a hole 52a for engagement in the fixed member 33, and inserting the other fastener 51b in the hole 52b for engagement in the rocking member 38 through the sliding bearing 53. This torsion coil spring 49 applies a resilient force to the rocking member 38 turning it around the fixed shaft 37 in the clockwise direction in FIG. 4.

At a position separated from the fixed shaft 37, there is a fixed arm 54 located on part of the fixed member 33 to support the base portion of the damper device 55. Also, at a position separated from the protruding section 42, the rocking arm 56 is integrally formed with a recessed section 57 into which the receiving block 58 is fitted. The tip portion of the plunger 59 of the damper device 55 is opposed to the end face of the receiving block 58.

Figure 7:
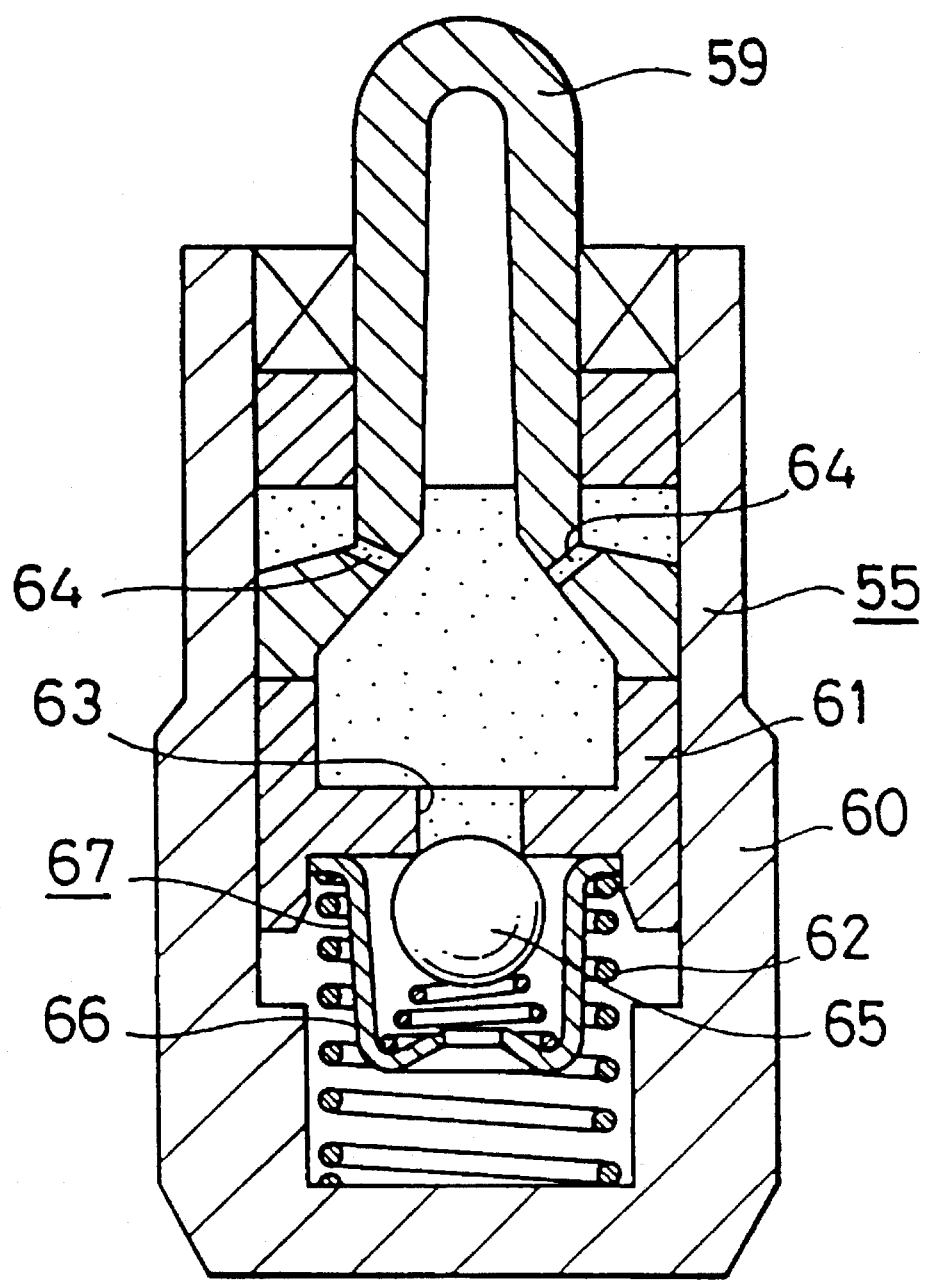
FIG. 7 is an enlarged cross section view of the damper device used in the auto tensioner of FIG. 4.

As shown in FIG. 7, the damper device 55 contains the cylinder 60 that has a viscous fluid in it such as silicon oil, and also inside this cylinder 60 the piston 61 can move freely in the axial direction (upward and downward in FIG. 7). Between this piston 61 and the bottom surface of the cylinder 60, the compression spring 62 pushes the piston 61 out of the cylinder 60. Also, the base end portion of the plunger 59 comes in abutment with this piston 61. When the piston 61 is displaced with reference to the cylinder 60 by the resilient force of the compression spring 62, the amount that the plunger 59 sticks out from the cylinder 60 is increased.

A circular hole 63 is formed in the center of the piston 61 while through-holes 64 are formed in the base side section of the hollow plunger 59 to form the path through which the axially opposite ends of the piston 61 are communicated with each other. The other side end of the plunger 59 is closed. At the open end of the circular hole 63, there is a ball 65 which forms the ball-type check valve 67 that opens and closes the path according to the resilient force of a second compression spring 66. This check valve 67 closes only when the piston 61 is displaced against the resilient force of the compression spring 62.

In this embodiment, due to the stopper pin 68, it is impossible to move the rocking member 38 around the fixed shaft 37 even if the resilient force of the torsion coil spring 49 is applied, whereby it is easily made to apply the belt 69 over the pulley 43.

Specifically, with the rocking member 38 moved in a rocking manner against the resilient force of the torsion coil spring 49, the small hole 70 in the rocking member 38 is aligned with the small hole 71 in the fixed shaft 33 to insert the stopper pin 68 into the small holes 70 and 71.

In this state, the pulley 43 which is supported by the rocking member 38 is not displaced by the resilient force of the torsion coil spring 49, so that the belt 69 can readily applied over the pulley 43. Then, after that, the stopper pin 68 is withdrawn, so that the pulley 43 is pushed toward the belt 69 by the resilient force of the torsion coil spring 49.

When the auto tensioner in the first embodiments of this invention is in operation, the rocking member 38 rocks according to the resilient force of the torsion coil spring 49, and the pulley 43, which is freely rotatably supported on the tip end portion of this rocking member 38, is elastically pushed toward the belt 69. Since the pulley 43 is pushed onto the belt 69, the rocking of the rocking member 38 is restricted, so that the rocking arm 56 formed on this rocking member 38 is no longer displaced. Therefore, when the piston 61, which makes up the damper device 55 supported by the fixed arm 54 of the fixed member 33, is displaced by the resilient force of the compression spring 62, the amount that the plunger 59 sticks out from the cylinder 60 increases, so that the tip end of the plunger 59 is pushed against the receiving block 58 supported on the tip portion of the rocking arm 56.

Figure 4:
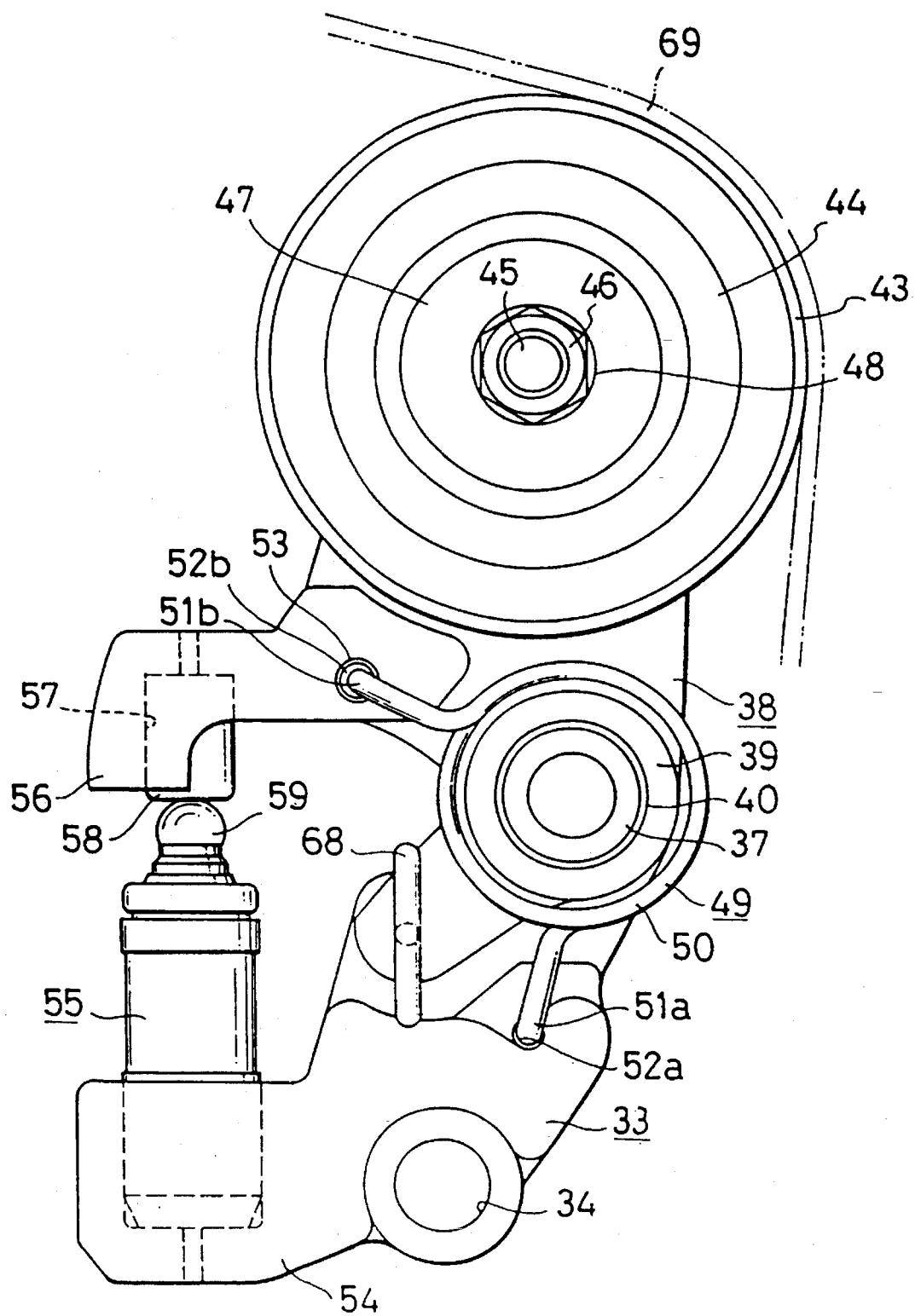
FIG. 4 is a front elevational view of a first embodiment of the auto tensioner according to the present invention.
Figure 5:
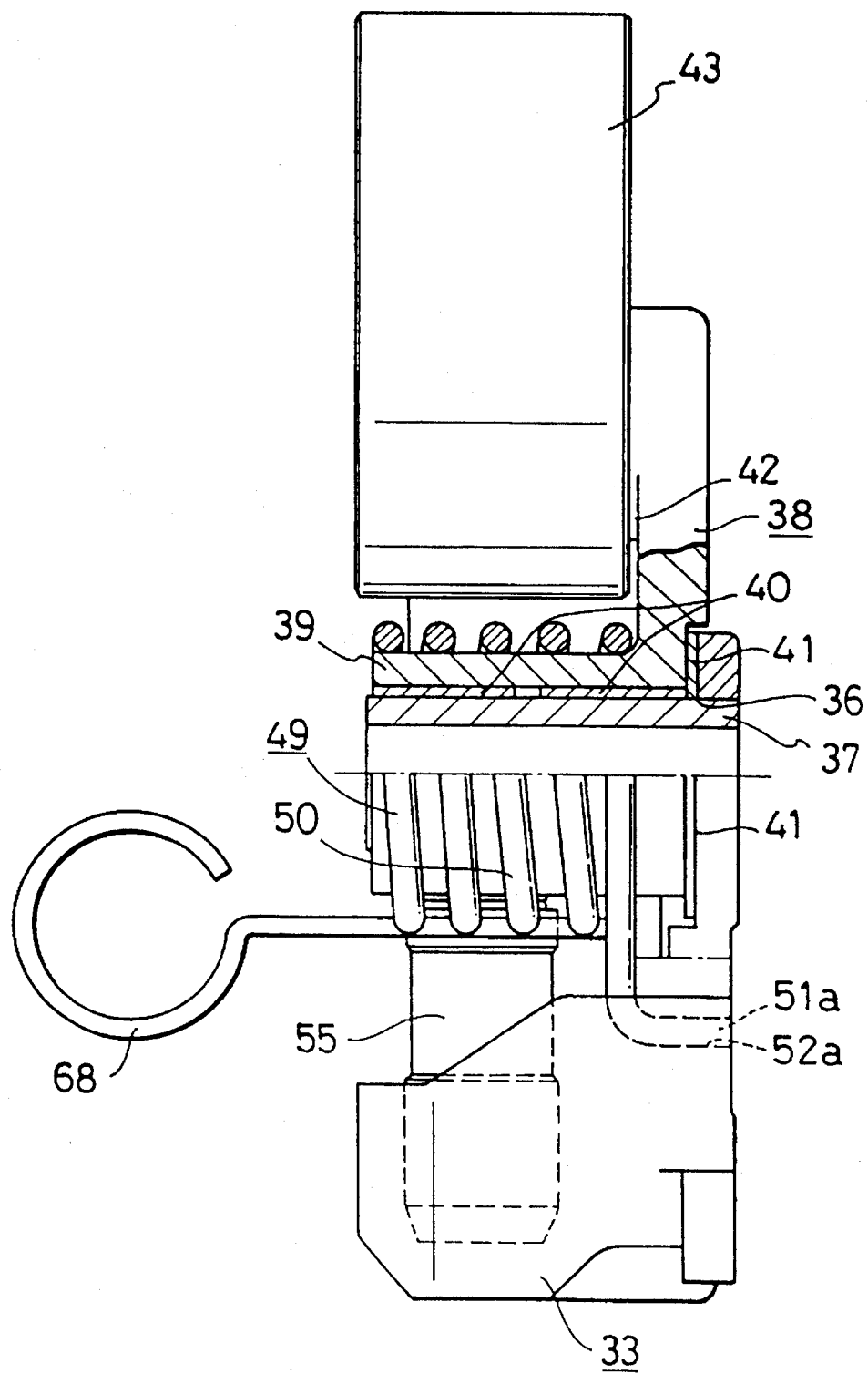
FIG. 5 is a right side elevational view of the auto tensioner of FIG. 4 with part of the auto tensioner cut away.
Figure 6:
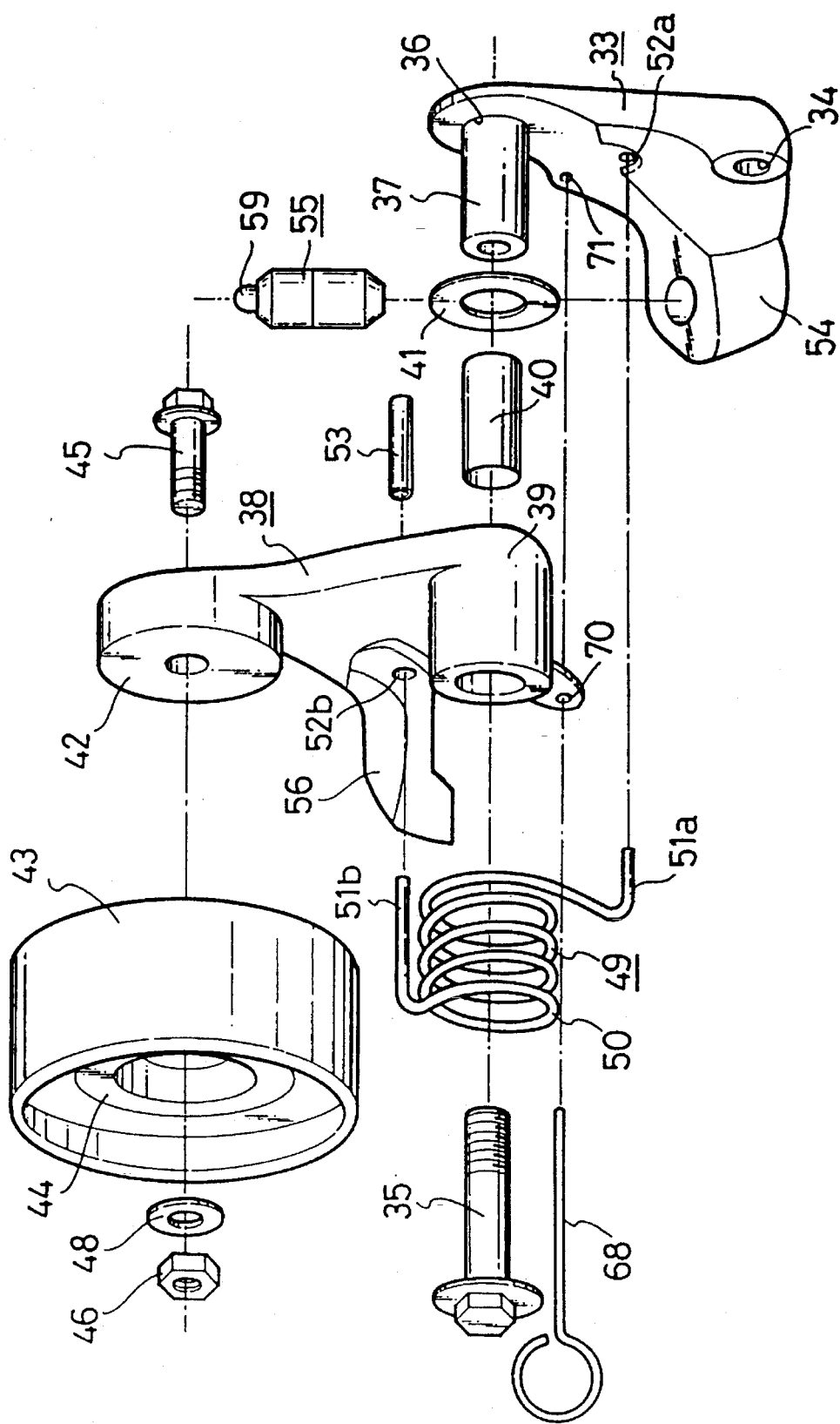
FIG. 6 is an exploded perspective view of the auto tensioner of FIG. 4.

In this state, when the belt 69 becomes loose, the rocking member 38 rocks around the fixed shaft 37 in the clockwise direction in FIG. 4 by the resilient force of the torsion coil spring 49, and the pulley 43 follows the movement of the belt 69. When this happens, displacement of the plunger 59 is a little delayed, so that the tip end of the plunger 59 is separated from the receiving block 58. Accordingly, when the belt 69 becomes loose, there is absolutely no resistance applied by the damper device 55 to the rocking member 38 which is rotated to cause the pulley 49 to follow the movement of the belt 69, allowing the pulley 43 to rapidly follow the movement of the belt 69, and thus preventing the tension in the belt 69 to drop. Furthermore, because the distance between the fixed shaft 37 located at the center of rotation of the rocking device 38 and the center of rotation of the pulley 43 is sufficiently large, the amount that the pulley 43 is able to displace is sufficiently large, and therefore even if the belt 69 becomes very loose, it is able to effectively remove the slack.

Due to the resilient force of the compression spring 62, the plunger 59 moves a little later than the movement of the rocking member 38, and it sticks out from the cylinder 60 until its tip end portion comes in contact or abutment with the receiving block 58 of the cylinder 60. In this way, when the plunger 59 is pushed out by the resilient force of the compression spring 62, the check valve 67, located inside the damper device 55, is opened, so that the displacements of the piston 61 and plunger 59 are relatively quick, and after only a very short time, the tip end of the plunger 59 comes in abutment or contact with the receiving block 58.

On the other hand, when the tension in the belt 69 is increased, the rocking member 38 turns around the fixed shaft 37 in the counter-clockwise direction of FIG. 4, against the resilient force of the torsion coil spring 49. In this state, the receiving block 58 is pushed to the tip end of the plunger 59, and the plunger 59 and the piston 61 must be pushed into the cylinder 60 against the resilient force of the compression spring 62 and the damper resistance in order to rotate the rocking member 38.

When this happens, the ball 65 in the check valve 67 inside the damper device 55, is pushed into the opening of the circular hole 63, so that the release path for communication between both ends of the piston 61 is closed. Therefore, displacement of the piston 61 and the plunger 59 is only performed slowly through the leakage path between the outside surface of the piston 61 and the inside surface of the cylinder 60. As a result, displacement of the pulley 43 supported by the rocking member 38 can also only be performed slowly by the function of the damper device 55, and the belt 69 is held or retained by the pulley 43, not allowing the vibration of the belt 69 to grow.

The damper device 55 provides a good damper resistance when the clearance between the outside surface of the piston 61 and the inside surface of the cylinder 60 is formed in the range from 5 μm to 40 μm in size and the viscous fluid has a viscosity from 50 cst to 1000 cst, and an optimum damper resistance when the clearance is formed in the range of 6 μm to 15 μm in size and the viscous fluid has a viscosity from 100 cst to 600 cst.

Figure 8:
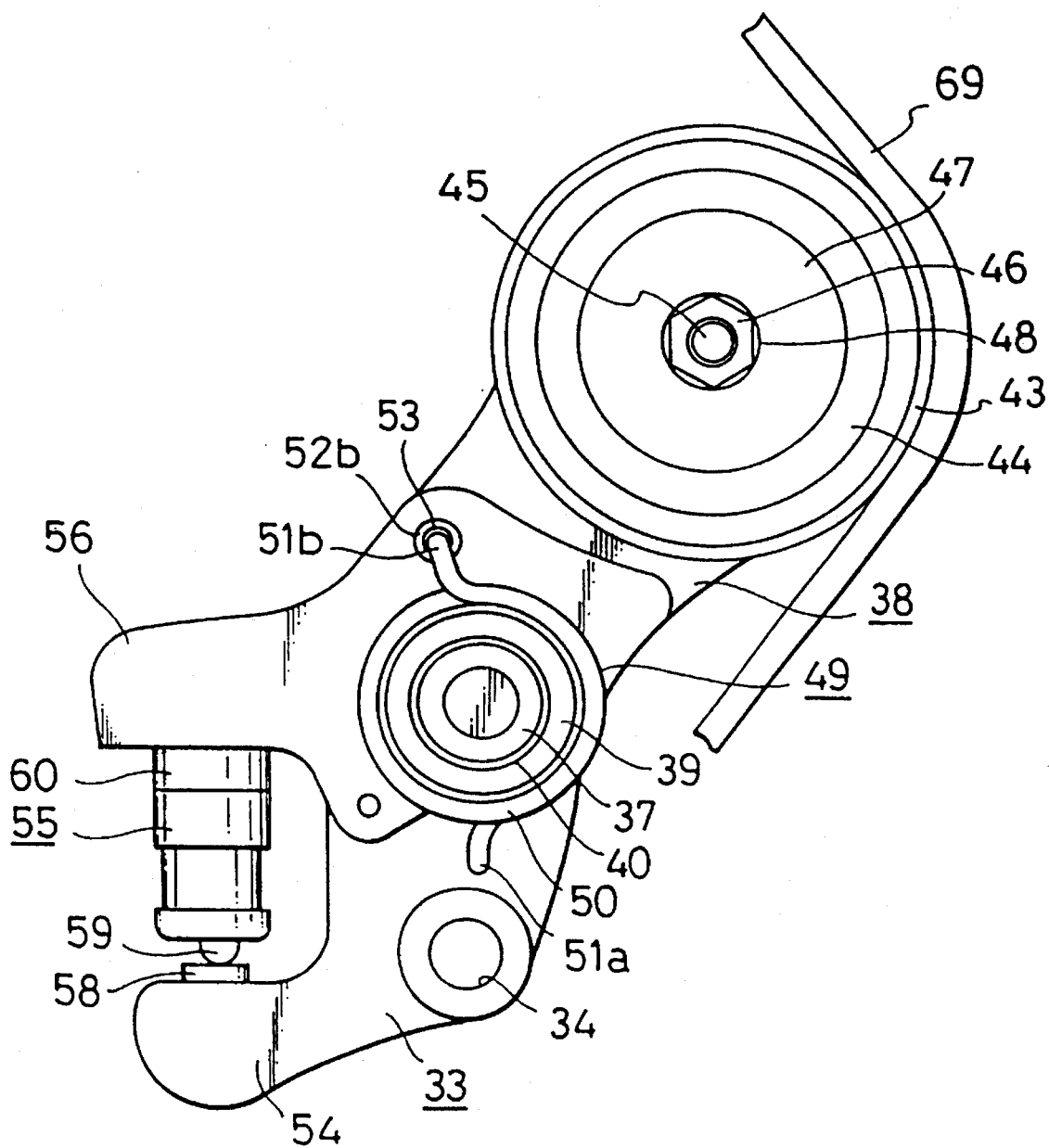
FIG. 8 is a front elevational view of a second embodiment of the auto tensioner according to the present invention.

FIG. 8 shows a second embodiment of this invention. The cylinder 60 of the damper device 55 is supported by the rocking arm 56, while the receiving block 58 is supported by the tip end portion of the fixed arm 54. The other part of construction and its function is substantially the same as those of the first embodiment.

The auto tensioner according to a third embodiment of this invention as shown in FIG. 9 to FIG. 12 comprises a fixed shaft 137 located in the base member 138 for installing the auto tensioner, a rocking member 123a having a tip portion and a base portion which is supported freely rotatably around this fixed shaft 137, an axle 144 that is located on the tip portion of this rocking member 123a in parallel to the fixed shaft 137, a pulley 124 which is supported freely rotatably around this axle 144, a coil section 127 provided around the fixed shaft 137 and having a torsion coil spring 126 having a pair of fasteners 128a, 128b located on its both ends, such that by securing the pair of fasteners 128a, 128b to the rocking member 123a and the base member 138, respectively, it applies a force to the rocking member 123a to push the pulley 124 onto the belt 135, and a damper device 131a of which one end comes in contact with a rocking arm 132a of the rocking section 123a, and the other end comes in contact with a fixed projection 148 located on the base member 138.

This damper device 131a comprises a cylinder 150 that contains a viscous fluid inside it, a piston 151 that fits inside this cylinder 150 so that it can freely move in the axial direction relating to the cylinder 150, a spring 152 that is located between the piston 151 and the cylinder 150 and which applies a force on the piston 151 in only one direction, a plunger 153 which increases the amount of protrusion from the cylinder 150 corresponding to the displacement of the piston 151 relative to the cylinder 150 caused by the resilient force of this spring 152, a path 154 which communicates axially opposite ends of the piston 151 with each other, and a check valve 158 which opens and closes this path 154. This check valve 158 closes only when the piston 151 is displaced relative to the cylinder 150 against the resilient force of the spring 152.

It will be noted that the fixed shaft 137 is located further out in the radial direction than the outer peripheral surface edge of the pulley 124.

The rocking member 123a (shown at the bottom of FIGS. 9 and 10) has a cylindrical section 136 at its base end portion and is supported by a bolt 137 on a base member 138 located on the front of the cylinder block. The fixed shaft is a bolt 137 extending through the cylinder 136. In other words, the cylindrical section 136 formed at the base end portion of the rocking member 123a fits around the bolt 137 by way of a sliding bearing 139. Also, by screwing the bolt 137 into the screw hole 140 formed in the base member 138, the rocking member 123a is supported by the base member 138 so that it freely rocks. Rocking of the rocking member 123a is smooth due to the existence of the sliding bearing 139.

Also, on the tip end portion of the rocking member 123a (shown at the top of FIGS. 9 and 10), there is a circular protruding section 141 which forms an axle that runs parallel to the bolt 137, and the inner ring 143 of a rolling bearing 142 is installed on this protruding section 141. The rolling bearing 142 freely rotatably supports the pulley 124. In other words, the region around the center hole of the inner ring 143 is secured by putting a bolt 144 through the hole in the center of the inner ring 143 and through a flat washer 145 and fastening it with a nut 146, so that the inner ring 143 is prevented from falling from the protruding section 141, and thus the pulley 124 is freely rotatably supported on the tip end portion of the rocking member 123a. In this condition, the bolt 137, which is the fixed shaft, is located further out in the radial direction than the outer peripheral surface of the pulley 124.

The inner ring 143 can be fastened to the rocking member 123a by screwing the bolt 144 to the nut 146 as described above, or it is also possible to press fit the inner ring 143 into the rocking member 123a, or make the inner ring 143 integral with rocking member 123a.

The coil section 127 of the torsion coil spring 126 is located around the circular section 136. This torsion coil spring 126 has a pair of fasteners 128a and 128b located on both ends of the coil section 127, and is held in place by inserting fastener 128a into a sliding bearing 161 located in a fastener hole 147a in the rocking member 123a, and inserting the other fastener 128b in the fastener hole 147b formed in the base member 138. This torsion coil spring 126 applies a force to the rocking member 123a turning it around the bolt 137 in the clockwise direction in FIG. 9.

When fastening the fastener 128b to the base member 138, it may be fastened by using the fastener hole 147b, or may also be fastened by using a groove, or by using a pin or other device formed on the base member 138.

At a position separated from the protruding section 141, there is an rocking arm 132a located on part of the rocking member 123a, and there is a hollow section 149 formed in this rocking arm 132a which contains a damper device 131a fitted into the hollow section 149. Also, at a position separated from the bolt 137, the base member 138 is integrally formed with a fixed projection 148, and the other end of the damper device 131a comes in contact or abutment with the surface of this projection 148.

Figure 11:
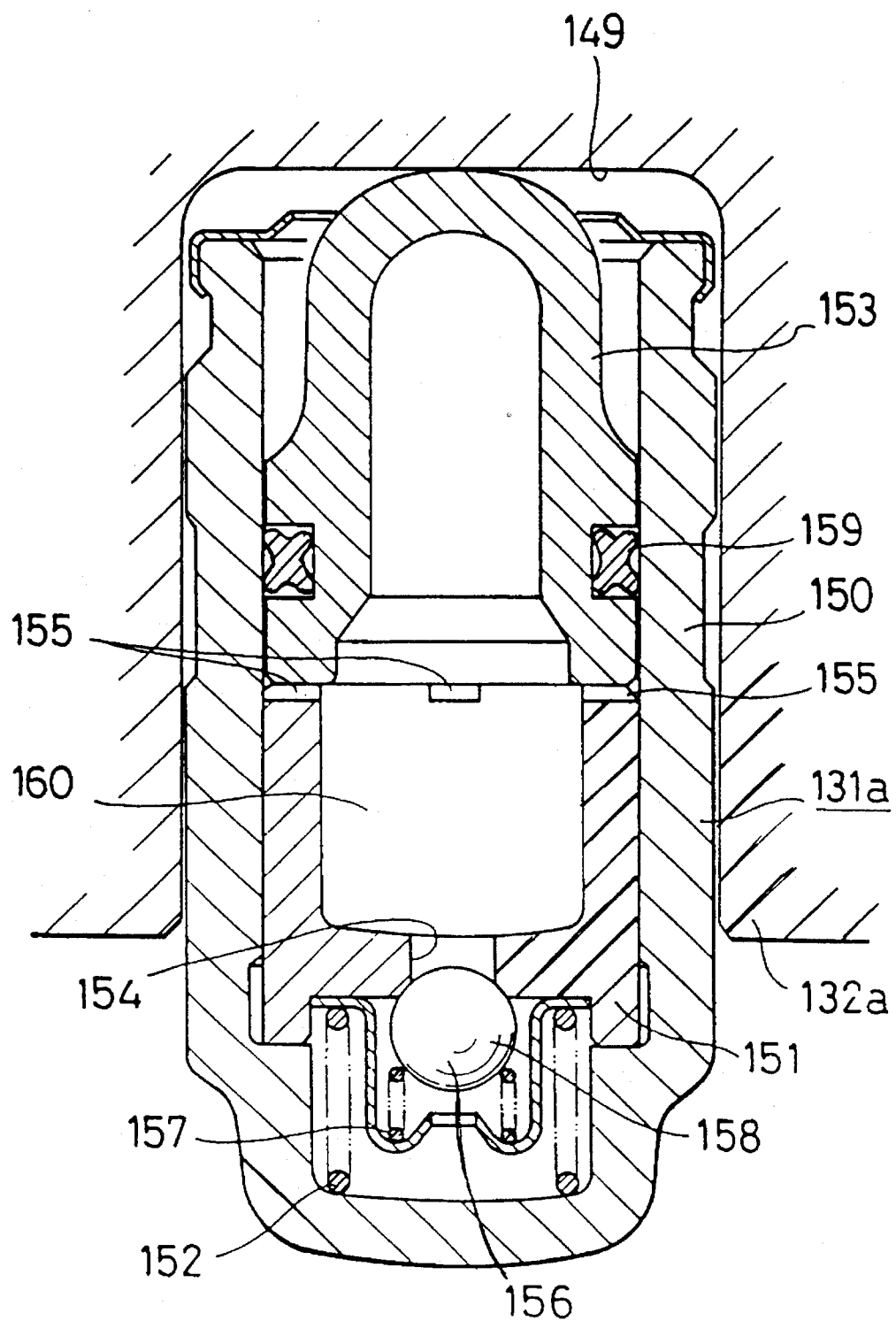
FIG. 11 is an enlarged cross sectional view of the damper means used in the auto tensioner of FIG. 9 in the state where the cylinder is retracted.
Figure 12:
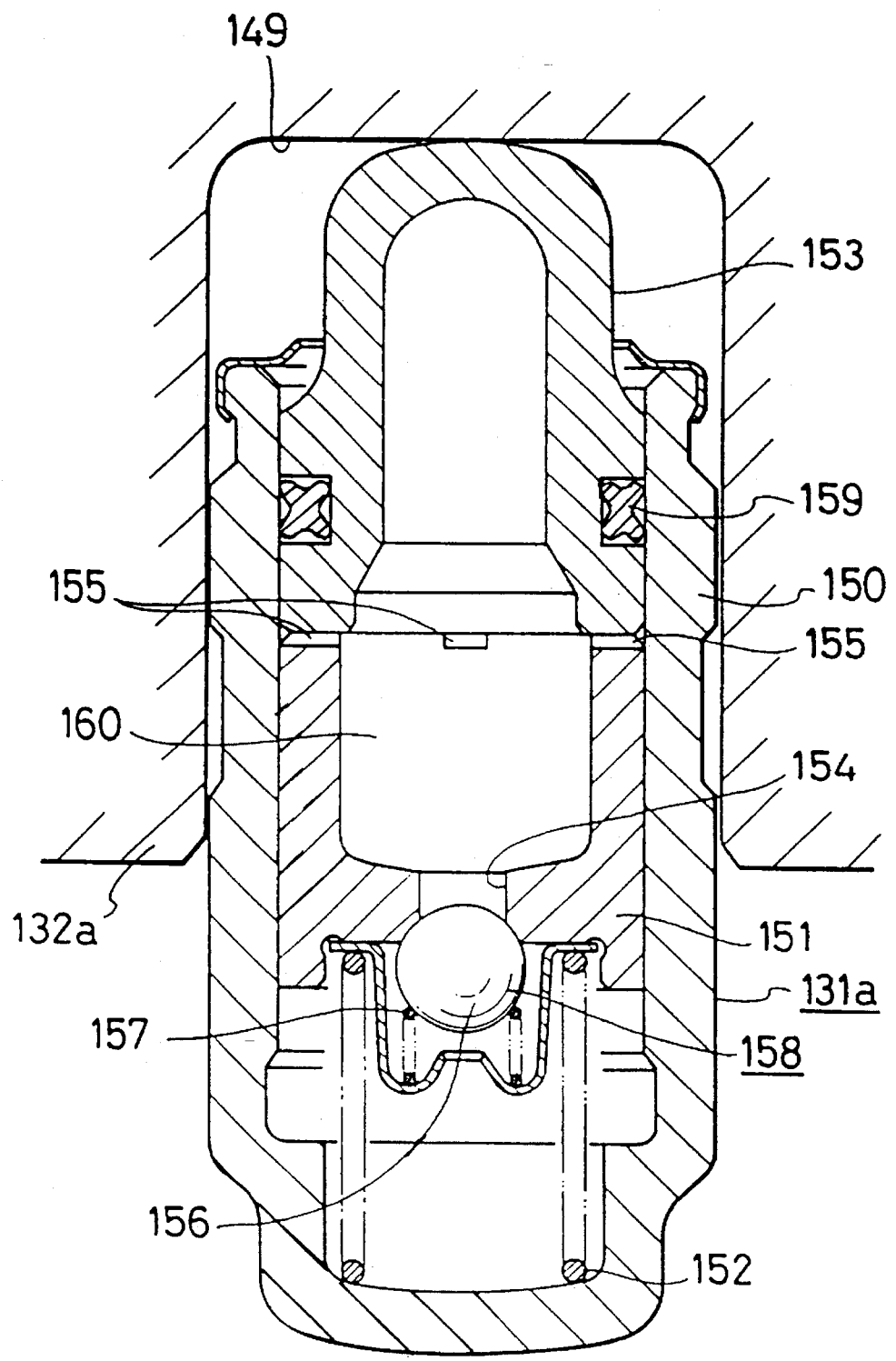
FIG. 12 is an enlarged cross sectional view of the damper means used in the auto tensioner of FIG. 9 in the state where the cylinder is advanced.

As shown in FIGS. 11 and 12, in the damper device 131a, the cylinder 150 has a viscous fluid in it such as silicon oil, and the piston 151 can move freely in the axial direction (upward and downward in FIGS. 11 and 12) inside the cylinder 150. Between this piston 151 and the bottom surface of the cylinder 150, the compression spring 152 pushes the piston 151 out of the cylinder 150. Also, the base end portion of a plunger 153 comes in contact with this piston 151. When the piston 151 is displaced with reference to the cylinder 150 by the resilient force of the compression spring 152, the amount that the plunger 153 sticks out from the cylinder 150 is increased.

The hole 154 formed in the center of the piston 151 forms the release path through which the axially opposite ends of the piston 151 are communicated with each other. At the open end of the hole 154, there is a ball 156 which forms the ball-type check valve 158 that opens and closes the path according to the resilient force of a second compression spring 157. This check valve 158 closes only when the piston 151 is displaced against the resilient force of the compression spring 152. Notches or through-holes 155 are formed on the edge of the open end of the piston 151 so as to communicate the very small space which exists between the outer peripheral surface of the piston 151 and the inner peripheral surface of the cylinder 150, with the space 160 which exists inside the piston 151.

In this embodiment of the invention, the damper device 131a is fitted into and supported by the rocking arm 132a in a manner that the side closer to the plunger 153 of the damper device 131a is fitted into the hollow section 149 of the rocking arm 132a, and the tip portion (lower portion in FIG. 11) of the cylinder 150 comes in contact or abutment with the projection 148 formed in the base member 138.

The end portion of the cylinder 150 is displaced in the protruding direction from the hollow section 149 corresponding to the rocking (upwards in FIG. 11) of the rocking member 123a. In other words, in the damper device 131a, the piston 151 is able to move freely relative to the cylinder 150, and as shown in FIGS. 11 and 12, if the side closer to the plunger 153 of the damper device 131a is fitted into the hollow section 149, the cylinder 150 is displaced corresponding to the displacement (upward in FIG. 11) of the rocking member 123a, so that the amount that the cylinder 150 sticks out from the hollow section 149 changes. In FIGS. 11 and 12 there is also a seal material 159.

In the auto tensioner in the third embodiment of this invention, constructed as described above, the function of applying pressure to the belt, the function of following the movement of the belt, and the function of controlling the rocking, is nearly the same as that described for the auto tensioners in the first and second embodiments as previously mentioned. That is, when the auto tensioner this embodiment is in operation, the rocking member 123a rocks according to the resilient force of the torsion coil spring 126, and the pulley 124, which is freely rotatably supported on the tip end portion of this rocking member 123a, is elastically pushed toward the belt 135. Since the pulley 124 is pushed onto the belt 135, the rocking of the rocking member 123a is restricted, and the rocking arm 132a formed on this rocking member 123a is no longer displaced.

As the piston 151 in the damper device 131a supported by the rocking arm 132a of the rocking member 123a is displaced relative to the cylinder 150 by the resilient force of the compression spring 152, as shown in FIG. 12, the amount that the cylinder 150 sticks out from the hollow section 149 increases, so that the tip end of the cylinder 150 is pushed against the projection 148 of the base member 138.

Figure 9:
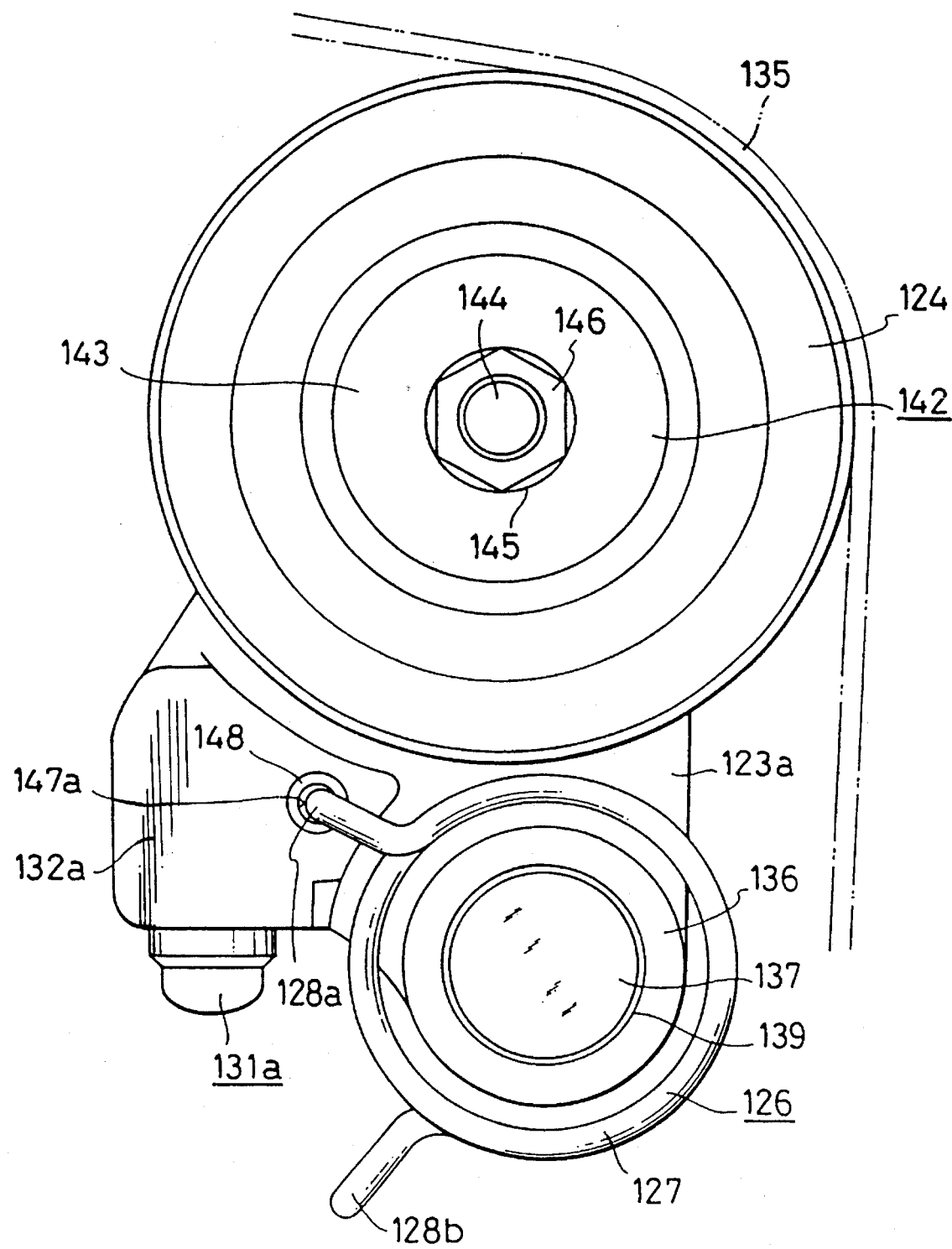
FIG. 9 is a front elevational view of a third embodiment of the auto tensioner according to the present invention.
Figure 10:
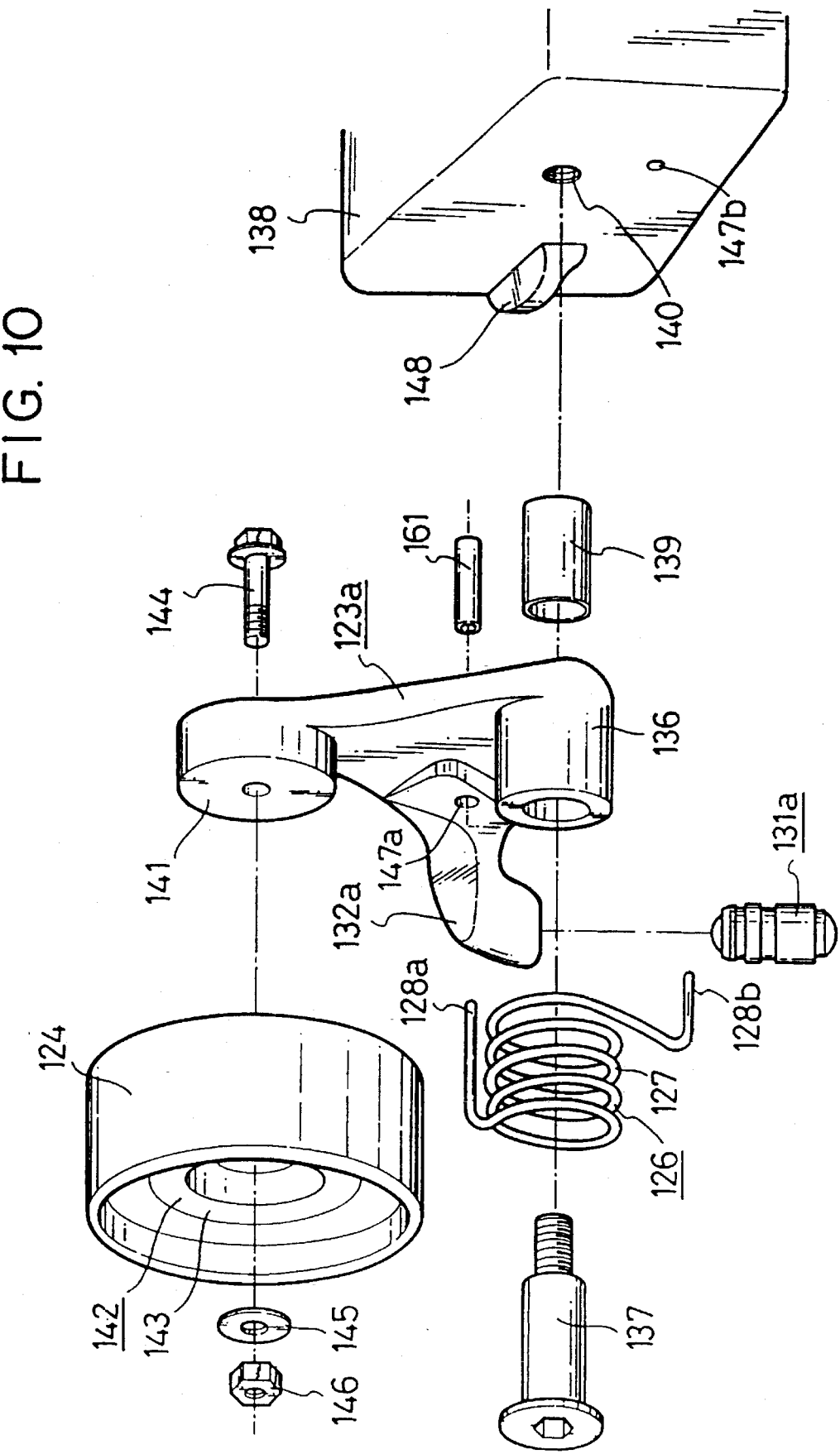
FIG. 10 is an exploded perspective view of the auto tensioner of FIG. 9.

In this state, when the belt 135 becomes loose, the rocking member 123a rocks around the bolt 137 in the clockwise direction in FIG. 9 by the resilient force of the torsion coil spring 126, and the pulley 124 follows the movement of the belt 135. When this happens, displacement of the cylinder 150 is a little delayed, so that the tip end of the cylinder 150 is separated from the projection 148. Accordingly, when the belt 35 becomes loose, there is absolutely no resistance applied by the damper device 131a to the rocking member 123a which is rotated to cause the pulley 124 to follow the movement of the belt 135, allowing the pulley 124 to rapidly follow the movement of the belt 135, and thus preventing the tension in the belt 135 from dropping. Furthermore, because the distance between the bolt 137 located at the center of rotation of the rocking device 123a and the center of rotation of the pulley 124 is sufficiently large, the amount that the pulley 124 is able to displace is sufficiently large, and therefore even if the belt 135 becomes very loose, it is able to effectively remove the slack.

Due to the resilient force of the compression spring 152, the cylinder 150 moves a little later than the movement of the rocking member 123a, and it sticks out from the hollow section 149 until its tip end portion comes in contact with the projection 148. In this way, when the cylinder 150 is pushed out by the resilient force of the compression spring 152, the check valve 158, located inside the damper device 131a, is opened by the displacement of the ball 156 regardless of the resilient force of the compression spring 157, so that the displacement of the cylinder 150 is relatively quick, and after only a very short time, the tip end of the cylinder 150 comes in contact with the projection 148.

On the other hand, when the tension in the belt 135 is increased, the rocking member 123a turns around the bolt 137 in the counter-clockwise direction of FIG. 9, against the resilient force of the torsion coil spring 126. In this state, the bottom of the hollow section 149 is pushed to the tip end of the plunger 153, and the plunger 153 and the piston 151 must be pushed into the cylinder 150 against the resilient force of the compression spring 152 and the damper resistance in order to rotate the rocking member 123a.

When this happens, the ball 156 in the check valve 158 inside the damper device 131a is pushed into the opening of the circular hole 154, so that the release path for communication between both ends of the piston 151 is closed. Therefore, movement of the viscous fluid at both ends of the piston 151 occurs only through the very small space or leakage path that exists between the outer peripheral surface of the piston 151 and the inner peripheral surface of the cylinder 150. Moreover, displacement of the piston 151 and the plunger 153 is only performed slowly. As a result, displacement of the pulley 124 supported by the rocking member 123a can also only be performed slowly by the function of the damper device 131a, and the belt 135 is held or retained by the pulley 124, not allowing the vibration of the belt 135 to grow.

The function of pushing the pulley 124 onto the belt 135 to apply pressure to the belt 135, the function of making the pulley 124 follow the movement of the belt 135, and the function of controlling the vibrations of the belt 135 are nearly the same as the auto tensioners in the first and second embodiments of the present invention described previously, however in the auto tensioner of this invention, the fixed member 33 (FIG. 4) provided in the auto tensioners in the first and second embodiments has been omitted, and so it is possible to make the auto tensioners more compact and lightweight. As a result, it is possible to locate it in a very small space.

Figure 13:
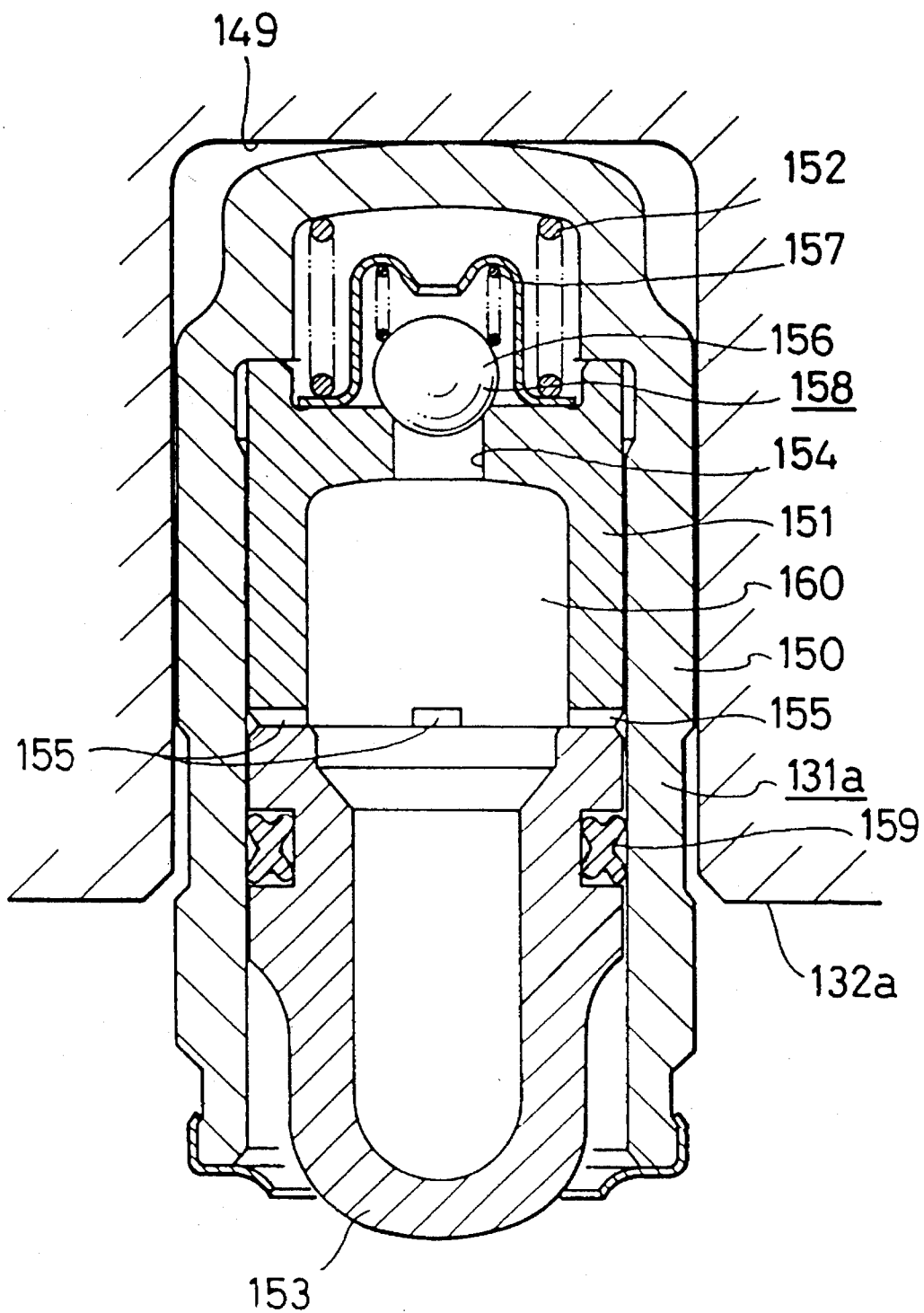
FIG. 13 is an enlarged cross sectional view of the damper means in the fourth embodiment similar to FIG. 12.

Next, FIG. 13 shows a fourth embodiment of this invention. In this embodiment of the invention, different from the third embodiment of the invention describe above, the cylinder 150 in the damper device 131a is supported in the hollow section 149 of the rocking arm 132a, and the tip portion of the projection 148 can come in contact or abutment with the plunger 153. Therefore, the amount that the plunger 153 sticks out changes according to the rocking of the rocking member 123a. The other construction and functions of this auto tensioner are the same as those of the third embodiment of the invention described above.

The auto tensioner of this invention is constructed and functions as described above, therefore, it is possible to make it very compact and lightweight with its superior durability and reliability maintained, and even more it is possible to manufacture it inexpensively. It does not require much space to install, and it is capable of constantly maintaining an optimum tension in the belt. Also, the amount that the pulley displaces can be very large, thus even when the slack in the belt is large, the pulley can sufficiently follow the movement of the belt.

What is claimed is:

1. An autotensioner for use in applying a tension to a moving belt, comprising:

a mount body formed with a fixed bracket having a projection with a damper support section, a rocking member rockingly mounted to the mount body through a first axle and having an arm, the fixed bracket engaged with the mount body through the first axle, a pulley rotatably mounted to the rocking member through a second axle for applying the tension to the moving belt, and a damper apparatus provided between the projection of the mount body and the arm of the rocking member, and supported by the damper support section of the projection, and the damper apparatus having a first abutment section which is abutted to the arm, and a second abutment section which is abutted to the projection of the mount body.

2. An autotensioner for use in applying a tension to a moving belt, comprising:

a mount body formed with a fixed bracket having a projection with a damper support section, a rocking member rockingly mounted to the mount body through a first axle and having an arm, a pulley rotatably mounted to the rocking member through a second axle for applying the tension to the moving belt, and a damper apparatus provided between the projection of the mount body and the arm of the rocking member, supported by the damper support section of the projection, and having a first abutment section which is abutted to the arm and a second abutment section which is abutted to the projection of the fixed bracket, and a spring having a first end engaged with the rocking member and a second end engaged with the mount body.

3. An autotensioner for use in applying a tension to a moving belt, comprising:

a mount body formed with a fixed bracket having a projection with a damper support section, a rocking member separated from the fixed bracket and rockingly mounted to the mount body through a first axle and having an arm, a pulley rotatably mounted to the rocking member through a second axle for applying the tension to the moving belt, and a damper apparatus provided between the projection of the mount body and the arm of the rocking member, supported by the damper support section of the projection, and having a first abutment section which is abutted to the arm and a second abutment section which is abutted to the projection of the fixed bracket, and a spring having a first end engaged with the rocking member and a second end engaged with the mount body.

4. An autotensioner for use in applying a tension to a moving belt, comprising:

a mount body formed with a fixed bracket having a projection with a damper support section, a rocking member rockingly mounted to the mount body through a first axle and having an arm, the fixed bracket engaged with the mount body through the first axle, a pulley rotatably mounted to the rocking member through a second axle for applying the tension to the moving belt, and a damper apparatus provided between the projection of the mount body and the arm of the rocking member, supported by the damper support section of the projection, and having a first abutment section which is abutted to the arm and a second abutment section which is abutted to the projection of the fixed bracket, and a spring having a first end engaged with the rocking member and a second end engaged with the mount body.

5. An autotensioner for use in applying a tension to a moving belt, comprising:

a mount body formed with a fixed bracket having a projection with a damper support section, a rocking member rockingly mounted to the mount body through a first axle and having an arm, a pulley rotatably mounted to the rocking member through a second axle for applying the tension to the moving belt, a damper apparatus provided between the projection of the mount body and the arm of the rocking member, supported by the damper support section of the projection, and having a first abutment section which is abutted to the arm and a second abutment section which is abutted to the projection of the fixed bracket, and a spring having a first end engaged with the rocking member and a second end engaged with fixed bracket.

6. An autotensioner for use in applying a tension to a moving belt, comprising:

a mount body formed with a fixed bracket having a projection with a damper support section, a rocking member separated from the fixed bracket and rockingly mounted to the mount body through a first axle and having an arm, a pulley rotatably mounted to the rocking member through a second axle for applying the tension to the moving belt, and a damper apparatus provided between the projection of the mount body and the arm of the rocking member, supported by the damper support section of the projection, and having a first abutment section which is abutted to the arm and a second abutment section which is abutted to the projection of the fixed bracket, and a spring having a first end engaged with the rocking member and a second end engaged with the fixed bracket.

7. An autotensioner for use in applying a tension to a moving belt, comprising:

a mount body formed with a fixed bracket having a projection with a damper support section, a rocking member rockingly mounted to the mount body through a first axle and having an arm, the fixed bracket engaged with the mount body through the first axle, a pulley rotatably mounted to the rocking member through a second axle for applying the tension to the moving belt, and a damper apparatus provided between the projection of the mount body and the arm of the rocking member, supported by the damper support section of the projection, and having a first abutment section which is abutted to the arm and a second abutment section which is abutted to the projection of the fixed bracket, and a spring having a first end engaged with the rocking member and a second end engaged with the fixed bracket.

* * * * *